UNITED STATES PATENT OFFICE.

AUGUSTUS C. CAREY, OF BOSTON, MASSACHUSETTS.

MANNER OF PACKING ENSILAGE.

SPECIFICATION forming part of Letters Patent No. 307,266, dated October 28, 1884.

Application filed August 18, 1884. (No specimens.)

*To all whom it may concern:*

Be it known that I, AUGUSTUS C. CAREY, a citizen of the United States, residing at Boston, in the county of Suffolk and State of Massachusetts, have invented certain new and useful Improvements in Packing Ensilage, of which the following is a full, clear, and exact description.

The object of this invention is to supply ensilage in mechantable shape to its users so that they may have it ready for feeding at a moment's notice any and every day in the year.

Ensilage as now prepared in bulk in silos is made by the individual farmer as time can be spared from other work in the busy season. Its preparation involves care, much labor, and a well-constructed silo; but its desirability and eminent usefulness as a winter food for cattle, and for cattle kept in the stall the whole year, are so great as to make it a very valuable adjunct to the stock-raiser and butter-maker. In this view I have sought to provide ensilage in such shape that it may be supplied as an article of merchandise the same as baled hay, and have found it eminently practicable to either put up vegetable matter commonly used for ensilage by compressing it into barrels and sealing it, or else barreling previously-prepared ensilage.

In carrying out my invention I prefer to take cut green cornstalks, millet, rye, and other like vegetable matter commonly used for making ensilage in silos, and press it, by means of steam, hydraulic, or other efficient presses, solid into barrels or like vessels and head it in. In this shape the expressed juices, if any, will permeate the mass to a greater or less extent and the air will be excluded. The stuff will therefore keep sweet for any length of time, and, being in small mass, keepers of two or three cows can have the advantage of green food for their stock in mid-winter and at all times without the expense of a silo. Ensilage in barrels, moreover, is much more accessible than in the silo, for it can be packed more readily, more solid, and can be got at without the labor of uncovering and danger of spoiling from exposing the large quantity in a silo. If the ensilage be prepared in the month of June, butter may be made in winter from the milk of cattle fed upon vegetation in its summer dress and have its delicious flavor. This is most certainly obtainable by packing the ensilage in small quantities, since the product can be made much more uniform and preserved in its original freshness with greater certainty. If the ensilage be desired in a fermented state or sour, a barrel may be opened and turned open end down and left for sufficient time for fermentation to set in, which will, depending on the atmosphere, be within a day or two, or until the air can reach the contents of the barrel. I propose, also, to pack prepared ensilage in barrels or other vessels for transportation and preservation by pressing or forcing the same in such vessels.

What I claim is—

Ensilage put up or packed under pressure in barrels or like portable vessels for transportation and accessibility for use, as set forth.

In testimony whereof I have hereunto set my hand this 15th day of August, A. D. 1884.

AUGUSTUS C. CAREY.

Witnesses:
CHESTER C. CONANT,
FRANCIS M. THOMPSON.